United States Patent
Seo et al.

(10) Patent No.: US 10,120,833 B2
(45) Date of Patent: Nov. 6, 2018

(54) PROCESSOR AND METHOD FOR DYNAMICALLY ALLOCATING PROCESSING ELEMENTS TO FRONT END UNITS USING A PLURALITY OF REGISTERS

(71) Applicant: Samsung Electronics Co., Ltd., Suwon-si (KR)

(72) Inventors: Woong Seo, Hwaseong-si (KR); Yeon-Gon Cho, Hwaseong-si (KR); Soo-Jung Ryu, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 178 days.

(21) Appl. No.: 14/165,881

(22) Filed: Jan. 28, 2014

(65) Prior Publication Data
US 2014/0215193 A1    Jul. 31, 2014

(30) Foreign Application Priority Data
Jan. 28, 2013    (KR) ........................ 10-2013-0009326

(51) Int. Cl.
*G06F 15/80*    (2006.01)
*G06F 9/38*    (2018.01)
*G06F 9/30*    (2018.01)

(52) U.S. Cl.
CPC ...... *G06F 15/8015* (2013.01); *G06F 9/30058* (2013.01); *G06F 9/3804* (2013.01);
(Continued)

(58) Field of Classification Search
CPC .... G06F 9/3887; G06F 9/3889; G06F 9/3851; G06F 9/30058
(Continued)

(56) References Cited

U.S. PATENT DOCUMENTS 5,371,896 A * 12/1994 Gove et al. .................. 712/20
6,272,616 B1 * 8/2001 Fernando et al. .............. 712/20
(Continued)

FOREIGN PATENT DOCUMENTS

| JP | 2000-207233 | 7/2000 |
|---|---|---|
| KR | 10-2006-0081419 | 7/2006 |
| KR | 10-2008-0083342 | 9/2008 |

OTHER PUBLICATIONS

Korean Office Action dated Mar. 10, 2015 in counterpart Korean Application No. 10-2013-0009326 (11 pages, with English translation).
(Continued)

*Primary Examiner* — Keith E Vicary
(74) *Attorney, Agent, or Firm* — F. Chau & Associates, LLC (57) ABSTRACT

Embodiments include a processor capable of supporting multi-mode and corresponding methods. The processor includes front end units, a number of processing elements more than a number of the front end units; and a controller configured to determine if thread divergence occurs due to conditional branching. If there is thread divergence, the processor may set control information to control processing elements using currently activated front end units. If there is not, the processor may set control information to control processing elements using a currently activated front end unit.

15 Claims, 4 Drawing Sheets

(52) U.S. Cl.
CPC .......... *G06F 9/3851* (2013.01); *G06F 9/3887* (2013.01); *G06F 9/3889* (2013.01)

(58) Field of Classification Search
USPC .......................................................... 712/20
See application file for complete search history.

(56) References Cited

U.S. PATENT DOCUMENTS

| | | | |
|---|---|---|---|
| 7,324,112 B1* | 1/2008 | Lindholm et al. ............ 345/522 |
| 7,353,369 B1 | 4/2008 | Coon et al. | |
| 7,366,878 B1 | 4/2008 | Mills et al. | |
| 7,594,095 B1 | 9/2009 | Nordquist | |
| 8,381,203 B1* | 2/2013 | Beylin et al. ................. 717/150 |
| 2005/0097552 A1 | 5/2005 | O'Connor et al. | |
| 2005/0289329 A1* | 12/2005 | Dwyer et al. ................. 712/234 |
| 2009/0049275 A1 | 2/2009 | Kyo | |
| 2011/0072249 A1* | 3/2011 | Nickolls et al. .............. 712/234 |
| 2012/0204014 A1* | 8/2012 | Leather et al. ............... 712/223 |
| 2013/0179662 A1* | 7/2013 | Choquette et al. ........... 712/206 |

OTHER PUBLICATIONS

Nomoto, S., Kyo, S., & Okazaki, S. "A Dynamic SIMD/MIMD Mode Switching Processor for Embedded Real-time Image Recognition Systems" IEEE Asian Solid State Circuits Conference (A-SSCC), Nov. 2011, pp. 17-20.

Kim, Hong-Yun, Young-Jun Kim, and Lee-Sup Kim. "MRTP: Mobile Ray Tracing Processor With Reconfigurable Stream Multi-Processors for High Datapath Utilization." IEEE Solid-State Circuits, vol. 47.2, Feb. 2012, pp. 518-535.

* cited by examiner

PROCESSOR AND METHOD FOR DYNAMICALLY ALLOCATING PROCESSING ELEMENTS TO FRONT END UNITS USING A PLURALITY OF REGISTERS

CROSS-REFERENCE TO RELATED APPLICATION(S)

This application claims the benefit under 35 U.S.C. § 119(a) of Korean Patent Application No. 10-2013-0009326, filed on Jan. 28, 2013, in the Korean Intellectual Property Office, the entire disclosure of which is incorporated herein by reference for all purposes.

BACKGROUND

1. Field

The following description relates to a processor capable of supporting single instruction multiple data (SIMD) mode and multiple instruction multiple data (MIMD) mode, and a method of supporting multi-mode functioning in the processor.

2. Description of Related Art

A processor based on a single instruction multiple data (SIMD) structure enables all of the processing elements included in the processor to share a common instruction by means of a single front end unit that fetches and decode the instruction, thereby reducing requirements for hardware resources and increasing the performance of parallel data processing by managing simultaneous instruction execution. In a processor that uses an SIMD structure, when the processor handles conditional branches, each conditional branch is sequentially executed, which hampers the efficient use of resources. However, the SIMD structure requires that conditional branches be sequentially executed. Since there is only a single front end unit, an SIMD structure requires that situations where code leads to thread divergence be resolved sequentially, as the SIMD structure causes the threads to be interdependent. Thus, a SIMD structure is able to reduce processor complexity in that an SIMD structure only requires a single front end unit, but thread divergence causes problems in an SIMD environment.

Alternatively, a processor based on a multiple instruction multiple data (MIMD) structure enables all processing elements to concurrently process individual threads using different front end units. An MIMD structure achieves fast operation processing during thread divergence and is thus considered as being suitable to process conditional branches. However, providing the individual front end units of a processor that uses an MIMD structure complicates the hardware design and increases the size of the processor, which also increases a manufacturing cost. Additionally, a processor with a fixed MIMD structure requires that the processor be built to provide a plurality of front end units even when not all of the front end units are actually being used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor includes front end units, a number of processing elements greater than a number of the front end units, and a controller configured to determine whether thread divergence occurs due to a conditional branch instruction detected by a front end unit, and in response to determining that thread divergence occurs, configured to set control information to control the processing elements to process an instruction using currently activated front end units, or, in response to determining that the thread divergence does not occur, configured to set control information to control the processing elements to process an instruction using a currently activated front end unit.

The processor may further include an interconnector configured to determine which processing element to use to process an instruction of one of the currently activated front end units, based on the control information, and transmit the instruction to the determined processing element.

The controller may include a plurality of registers associated with the respective front end units and be configured to store control information of the respective corresponding front end units.

The control information may include processing element allocation information of the respective front end units.

Each of the plurality of registers may include as many bit-areas as a total number of processing elements to store the processing element allocation information of a front end unit corresponding to the each of the plurality of registers.

The controller may determine whether thread divergence occurs by receiving from a processing element a result of processing a conditional branch instruction detected by one of the currently activated front end units, and, if a determination is made that the thread divergence occurs, additionally activates one of non-activated front end units.

The controller may allocate some processing elements to the additionally activated front end unit and stores allocation information regarding the allocation in a register associated with the additionally activated front end unit.

The processor may provide that in response to the currently activated front end units and the additionally activated front end unit completing processing of a conditional branch, the controller deactivates the additionally activated front end unit and causes processing elements allocated to the additionally activated front end unit to be re-allocated to the currently activated front end units.

In another general aspect, a method for supporting multi-mode processing includes detecting, at a currently activated front end unit of a processor, a conditional branch instruction, determining, at a controller of the processor, whether thread divergence occurs based on the detected conditional branch instruction, in response to determining that the thread divergence occurs, additionally activating one of non-activated front end units, and setting, at the controller, control information such that processing elements process an instruction received from the activated front end units.

The method may provide that the processor includes front end units, and a number of processing elements that is greater than a number of the front end units.

The method may provide that the determining of whether the thread divergence occurs further comprises receiving from the processing elements a result of processing the conditional branch instruction and determining whether the thread divergence occurs, based on the received result.

The method may provide that the controller further includes registers associated with the respective front end units and storing control information of the respective corresponding front end units in the registers.

The control information may further include processing element allocation information of the respective front end units.

Each of the registers may further include as many bit-areas as a total number of processing elements to store the processing element allocation information of front end units corresponding to the registers.

The setting of the control information may further include setting bit values of a bit-area of a register associated with the additionally activated front end unit wherein the bit values correspond to processing elements allocated to the additionally activated front end unit.

The method may further include determining, at the controller, whether conditional branches processed by both the currently activated front end unit and the additionally activated front end unit are terminated, in response to a determination that the conditional branches are all terminated, deactivating the additionally activated front end unit, and setting control information to re-allocate to the currently activated front end unit processing elements allocated to the additionally activated front end unit.

In another general aspect, a multimode processor includes a currently activated front end unit, configured to detect a conditional branch instruction, and a controller, configured to determine whether thread divergence occurs, based on the detected conditional branch instruction, and in response to determining that the thread divergence occurs, additionally activate a non-activated front end unit, and set control information such that processing elements process an instruction received from the activated front end units.

The multimode processor may further include one or more inactive front-end units, and processing elements, wherein the number of processing elements is greater than the total number of front-end units.

The determining of whether the thread divergence occurs may further include receiving from the processing elements a result of processing the conditional branch instruction and determining whether the thread divergence occurs, based on the received result.

In another general aspect, a multimode processor includes currently activated front end units, configured to execute separate conditional branches, a controller, configured to determine whether the conditional branches are all terminated, and in response to determining that the conditional branches are all terminated, deactivate at least one front end unit.

The controller may be further configured to re-allocate the processing elements of the deactivated front end unit to another front end unit.

The processor may further include registers associated with the respective front end units and configured to store control information of the respective corresponding front end units in the registers.

The control information may further include processing element allocation information of the respective front end units.

Each of the registers may further include as many bit-areas as total number of processing elements to store the processing element allocation information of front end units corresponding to the registers.

The setting of the control information may further include setting bit values of a bit-area of a register associated with the additionally activated front end unit wherein the bit values correspond to processing elements allocated to the additionally activated front end unit.

The re-allocating may be performed by performing a logical OR operation on the bit-areas of the deactivated front end unit and the other front end unit.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, a processor utilizing a method for supporting multi-mode execution in the processor will be described with reference to the accompanying drawings. One application for such a processor is augmented reality, including applications such as three-dimensional graphics, video, and ray tracing. Such applications may potentially be accelerated by a GPU, but there may be too many branch divergences to handle them efficiently. Various embodiments provide ways to handle branch divergences efficiently.

As discussed above, processors, such as parallel processors with multiple processing elements, may be SIMD-mode or MIMD-mode processors. Embodiments provide for a processor that allows processing elements to dynamically share front end units, and that allows the processor to switch mode between SIMD and MIMD execution. By sharing front end units and switching between SIMD and MIMD, embodiments minimize the design costs for front end units, while simultaneously gaining the performance advantages that accompany operating in MIMD mode in situations where there is thread divergence.

Figure 1:
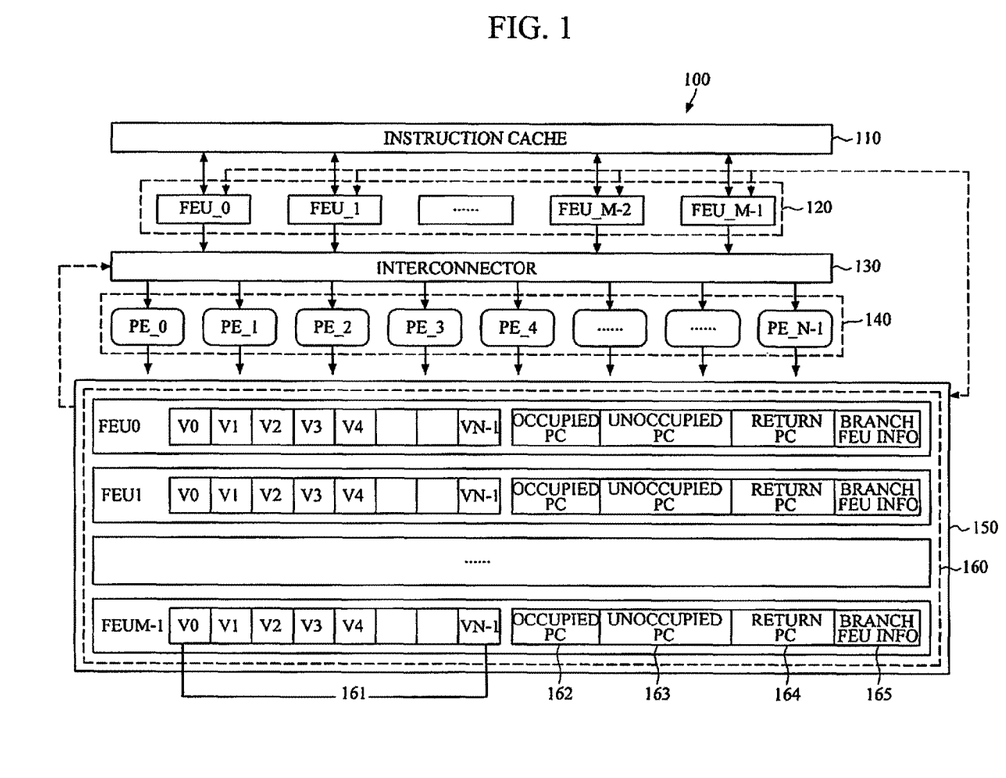
FIG. 1 is a diagram illustrating a processor according to an example embodiment.

FIG. 1 is a diagram illustrating a processor according to an example embodiment. Referring to FIG. 1, the processor 100 may include front end units 120, an interconnector 130, processing elements 140, and a controller 150. At least two front end units 120 are provided, and the number of front end units 120 is appropriately chosen in consideration of scalability of the processor 100. The scalability of the processor 100 refers to the ability of the processor 100 to handle increasing amounts of work. Scalability may also involve different considerations depending on characteristics of the increased work. In an example, the number of front end units 120 is chosen based on the amount of data the processor 100 is required to perform in a given amount of time. However, scalability may also require consideration of the ability to process data using parallelism, as certain processing tasks are better adapted to being performed in parallel.

For example, if the processing requirements of the processor 100 are primarily sequential threads with little divergence, there are different scalability considerations than if the processor 100 is required to handle a plurality of highly divergent threads. One reason why the divergence of the threads is considered with respect to scalability is that if the threads are sequential, it is very easy to run the threads in parallel without requiring that the threads wait for one another before continuing to execute. Based on the amount and characteristics of data that the processor 100 is designed to process, and the timing requirements for that processing, the appropriate number of front end units 120 varies. For example, if it is anticipated that the data to be processed by the processor 100 will contain complex, highly branched code, an embodiment that includes a relatively large number of front end units 120 is appropriate. If it is anticipated that the data to be processed will be largely sequential code, with small amounts of thread divergence, the processor 100 may be designed to contain a smaller number of front end units 120. Alternatively, the appropriate number of front end units 120 is selected based on experimentation or other heuristics or principles that provide for an appropriate number of front end units 120 that provide an acceptable balance between performance and processor complexity. In an example, the number of front-end units 120 is derived based on an algorithm or formula that uses information about various factors or statistics that characterize the data that the processor is to work with, and based on the information, yields a suggested number of front end units 120.

In an example, there are a number M of front end units 120, where the number M is determined using approaches that were discussed above, or another approach that allows determination of the number M for an embodiment. The front end units 120 fetch instructions from an instruction cache 110 and decode the fetched instructions. The instruction cache 110 stores instructions for the processor 100 to reduce the time necessary to access instructions by providing a faster, alternative source for instructions than main memory. For example, the instruction cache 110 provides instructions for fast access by front end unit 120 so as to speed up fetching of executable instructions. Various types of cache implementations are used in different instruction caches 110 in different embodiments. In various examples, the caches consist of multiple levels, use different types and speeds of memory, and so on.

As mentioned above, the instruction cache 110 fetches and decodes executable instructions for processing by the processor 100. Various types of instruction cache 110 implementations are used to provide the functionality for the instruction cache 110. However, in some circumstances, the instruction cache 110 does not include a particular executable instruction. Such a situation is called a cache "miss," by contrast to a cache "hit," which is the scenario in which the desired information is available in the cache and it is not necessary to find the desired information in main memory. When there is a cache "hit," the cache fetches an instruction by accessing the appropriate instruction in the cache. However, when there is a cache "miss," in order to access the desired information, the cache retrieves the corresponding information from main memory, which is considerably slower. Usually, when the information is retrieved from main memory, the information is introduced into the cache, as one of the principles behind caching is that if information is used once, it is more likely to be used again and therefore it is subsequently maintained in cache memory. However, since caches generally have limited storage capacity, caches use a variety of algorithms and techniques to remove less relevant information to ensure that the information stored in the cache is most likely to prevent the need to access main memory.

The executable instructions may be machine language instructions. Such machine language instructions provide the information necessary for a processing element 140 to carry out a single processing step. In an example, the executable instructions include an opcode and operands. The opcode, when decoded by the front end unit 120, identifies the operation to be performed, and the operands are data upon which that operation acts. In an example, the operands refer to registers of the processor 100 that contain information to be acted upon by the opcode. For example, opcodes may be of various categories, such as arithmetic, data transfer, logical, conditional branch, or unconditional jump. As noted above, in an embodiment the processor 100 is designed to respond in a special way to conditional branch opcodes. Opcodes generally provide for a sequence of instructions that can be executed in parallel without causing thread divergence. However, a conditional branch opcode, when executed, may cause thread divergence because the conditional branch opcode can resolve in multiple ways, and it may not be possible to resolve the effects of the conditional branch immediately. Hence, in order to continue parallel execution when a conditional branch occurs, the processor 100 does so by using multiple front end units 120 to continue processing until the thread divergence has resolved.

The decoding of the fetched instruction by the front end unit 120 allows the processor 100 to interpret the fetched instruction so that the instruction may be executed. As discussed above, the front end unit 120 fetches the instruction by requesting it from the instruction cache 110 if the instruction is available, or from main memory (not shown) if there is a cache miss. The front end unit 120 then decodes the instruction to establish what operation is being performed, based on the opcode, and what data it is operating on, based on the operands. Generally, the significance of the operands varies based on the operation corresponding to the opcode. For example, with an "add" opcode, two of its operands are added and the sum is placed in the third operand. Alternatively, with a "load-word" opcode, the operands represent a memory address to load from and a destination register to store the memory information into.

The processing elements 140 process the instructions incoming from the front end units 120, and there are at least two processing elements (PE_0, . . . , and PE_N−1) 140. The processing elements 140 process instructions autonomously, so the processing elements 140 rely upon the front end units 120 to manage assigning instructions in an appropriate way so that the parallelism does not result in any incorrect results. In an example, there are a number N of processing elements 140 that is more than the number M front end units 120. When N is greater than M, it creates a situation in which at least one of the M front end units 120 is sending decoded instructions to more than one processing element 140. Hence, the front end units 120 manage the parallelism and relationships between the processing elements 140.

A plurality of processing elements 140 may process instructions using a single front end unit 120, or two or more front end units 120. When the plurality of processing elements 140 use a single front end unit 120, the processor 100 acts as an SIMD processor. When the plurality of processing elements 140 use two or more front end units 120, the processor 100 acts as an MIMD processor. In embodiments, the processor 100 has the ability to adjust the number of front end units 120 that are actively operating to decode instructions and send them to the plurality of processing elements 140 so as to optimize performance for the processor 100.

The dataflow between the instruction cache 110 and the processing elements 140 varies based on how individual instructions are routed through the front end units 120 to be processed by the processing elements 140. Additionally, the dataflow varies based upon the type of instruction that is being routed. For example, ordinary instructions are simply executed in sequence, and are distributed to the processing elements 140 in parallel by the front end units 120. However, if there is a conditional branch instruction, it may be necessary for the front end units 120 to determine how to manage the processing elements 140 so as to ensure correct results while minimizing delays and slowdown.

In an example, the controller 150 dynamically selects the front end units 120 to fetch and decode an instruction from the instruction cache 110 and selects the processing elements 140 to process the instruction using the selected front end units 120 depending on the configuration of an embodiment. Hence, the controller 150 acts as an intermediary that allows for a dynamic mapping between the front end units 120 and the processing elements 140. Because of the dynamic mapping provided by the controller 150, the processor 100 is able to combine the advantages of an SIMD mode and an MIMD mode. If an SIMD mode is sufficient, due to a lack of branching and thread divergence, the controller 150 routes instructions between a single front end unit 120 and the processing elements 140, and hence the processor 100 operates in a way that is similar to an SIMD mode processor. However, the controller 150 is also able to dynamically map instructions between multiple front end units 120 and the processing elements 140. In this situation, the processor 100 is operating in an MIMD mode. Because the controller 150 is able to dynamically select which front end units 120 send an instruction to which processing elements 140, the controller 150 is able to adapt how instructions are handled in a manner that improves performance, because the controller 150 is able to better manage resources in a way that decreases inefficiency and enhances processing speed. For example, the controller 150 is able to minimize processing overhead by minimizing the number of active front end units 120 to a number that is required for a particular processing task. However, the controller 150 is also able to activate front end units 120 as needed, so when the processing task calls for multiple front end units 120, the controller 150 is able to activate additional front end units 120. For example, the controller 150 initially uses a single front end unit 120 because there is no thread divergence or branching, and hence, the processor 100 acts as an SIMD processor. However, as the processor 100 encounters branching instructions, the controller 150 is able to dynamically activate front end units 120 so that multiple branches can be pursued in parallel, so that way the processor 100 does not have to wait, thereby avoiding the potential disadvantages of remaining in SIMD mode when encountering thread divergence, which could require delaying the whole course of parallel processing while waiting for a single divergent thread to resolve. The dynamic activation and deactivation of front end units to optimize processing is discussed further, below.

In embodiments, resource management by dynamic selection of the front end units 120 involves changing modes between single instruction multiple data (SIMD) mode and multiple instruction multiple data (MIMD) modes. Each of these modes refers to a different way of handling parallel computing. In SIMD processing, there are multiple processing elements that perform the same operation on multiple data points simultaneously. Hence, SIMD includes data level parallelism, in that all of the data is processed in the same way. However, the SIMD approach creates problems when branching or thread divergence occurs, because in order for all of the data to be processed in the same way, if there is branching the other threads may be required to wait for a divergent thread to catch up because SIMD requires processing the data together. In MIMD processing, machines using MIMD have a number of processors that function autonomously and asynchronously. In MIMD, each processor's processing is independent of the other processors' processing, and the different processors may execute different instructions on different pieces of data. However, while the independence provided by MIMD allows each processor to perform its functionality without the requirement to take into account the operation of the other processors, in order to allow the processors to function independently in this manner, it is necessary to include additional infrastructure to ensure that the processors do not interfere with one another's operation. For example, the memory architecture of an MIMD may require a shared memory model or distributed memory model that is able to prevent the processors from interfering with one another when accessing memory.

As discussed above, each of these modes is better adapted to certain usage scenarios. MIMD mode offers the ability to handle divergent threads simultaneously, which allows for better parallelism, especially for branching code, but incurs certain overhead as MIMD may require sufficient support for the functionality required to isolate the threads. Hence, dynamic selection of the front end units 120 may involve selectively switching between SIMD and MIMD mode so that MIMD may be invoked when using MIMD results in a performance improvement. For example, some embodiments begin executing in an SIMD mode, and as execution encounters branching and thread divergence, the embodiments activate front end units 120 that are still available to provide as much parallelism as possible, based upon factors such as the number of threads, the characteristics of the divergence, and the number of available front end units 120.

For example, SIMD may be chosen in a case in which any executing threads are not divergent, and thus in such a situation the processing overhead involved with MIMD outweighs the parallel processing benefits that come from using MIMD. As discussed above, SIMD is well-adapted when there is data level parallelism. If all of the processing elements 140 are performing the same operations, and the only difference is that the processing elements 140 are operating on different data, then there is no requirement for multiple front end units 120 to fetch and decode instructions, because all of the processing elements 140 are able to receive the same instruction from a single front end unit 120 without difficulties.

In the case where thread divergence due to a conditional branch has not yet occurred or all conditional branches have ended, the controller 150 sets control information for the processor 100 to be operated in SIMD mode in which only one front end unit 120 is activated and all of the processing elements 140 perform data processing by using the currently activated front end unit 120 to process data. In this situation, all of the processing elements 140 are performing the same, single instruction. By using only one activated front end, the processor 100 does not have to discriminate between multiple front end units 120 when managing instructions received from the instruction cache 110, which avoids the high front end unit cost which occurs in MIMD operation. While using multiple front end units 120 to allow the processing elements 140 to function more autonomously provides advantages when managing multiple divergent threads, using multiple front end units 120 creates the requirement for upfront management and dispatching of the instructions by multiple front end units 120, which can lead to greater processor complexity and potential slowdown due to additional overhead.

In this example, in which SIMD is used, the single front end unit 120 may be previously specified, and, for example, the control information may be set to activate front end unit 120 FEU_0 as illustrated in FIG. 1 to be used in processing data. When there is a single active front end unit 120, and hence the processor 100 is operating in SIMD mode, the single active front end unit 120 is the only front end unit 120 that fetches and decodes instructions from the instruction cache 110, and the other front end units 120 are inactive and do not interact with the instruction cache 110. Instead, the processor 100 simply acts as if the active front end unit 120 is its only front end unit 120. However, in embodiments, any of the front end units 120 may be chosen as the single front end unit 120. Additionally, in some embodiments the single front end unit 120 is not previously specified, and is determined dynamically. For example, if a particular front end unit 120 has a faster connection to other parts of the processor 100, that particular front end unit 120 may be chosen dynamically. As another example, a particular front end unit 120 may be chosen if there is some distinctive feature of that front end unit 120 that differentiates the front end unit 120 from the other front end units.

If the currently activated front end unit 120 detects a conditional branch instruction, when fetching and decoding instructions from the instruction cache 110, and thread divergence occurs due to the conditional branch instruction, the controller 150 may set the control information to operate the processor 100 in multiple instruction multiple data (MIMD) mode in which at least one of the non-activated valid front end units 120 is additionally activated and the processing elements 140 use the two or more activated front end units 120 to process the instruction together in parallel. By using multiple activated front end units 120, the controller 150 is able to cause the front end units 120 to pursue, independently, separate branches of execution until the divergent threads of execution resume a unified execution flow. Once a conditional branch instruction and thread-divergence have occurred, it is appropriate to use MIMD mode because MIMD mode provides a way to process the conditional branch instruction by pursuing the execution of multiple threads simultaneously. The controller 150 may receive from the processing element 140 a result of processing the conditional branch instruction detected by the currently activated front end unit 120 and determine whether thread divergence occurs based on the received result, and determine whether to additionally activate another front end unit 120. For example, processing the conditional branch instruction may result in a value that is Boolean in nature, such as "true" or "false." However, the conditional branch instruction may provide similar results in other forms. For example, the return value of the conditional branch instruction may be "0" or "1," where "0" may indicate "false" and "1" indicates "true." Alternatively, the conditional branch instruction may return an enumerated determination of whether to branch, or not to branch. Essentially, a conditional branch instruction directs continued execution in two possible ways. In one scenario, the execution of the program continues without branching. In this scenario, where no branching occurs, it is possible to continue execution without the requirement to involve another front end unit. In the other possible scenario, execution branches off from the main execution pathway due to a conditional branch instruction. When the execution branches, there are more than one potential set of instructions to be executed. Hence, additional front end units 120 are able to manage those additional sets of instructions because the additional front end units 120 are able to execute those additional instructions independently from one another and asynchronously, avoiding the interdependency that in an SIMD mode would require that the execution proceed one branch at a time.

In response to the at least one additional front end unit 120 being activated, the controller 150 sets control information such that some processing elements 140 that have been allocated to the currently activated front end unit 120 or that have not been yet allocated to any front end units 120 may be reallocated to the additionally activated front end unit 120. By reallocating processing elements 140 to a new front end unit 120, the controller 150 becomes able to control the flow of information from the plurality of front end units 120 to the appropriate processing elements 140 so that instructions retrieved by the front end units 120 are executed appropriately in parallel without interfering with one another during time periods when threads are divergent.

The interconnector 130 routes instructions from the front end units 120 to the processing elements 140. For example, the interconnector 130 may determine a processing element 140 to process an instruction of the currently activated front end unit 120 using the control information set by the controller 150, and transfers the instruction to the determined processing element 140. The controller 150 and the interconnector 130 interact to determine which front end units 120 are active and how instructions are conveyed from front end units 120 to processing elements 140 for execution.

In an example, the interconnector 130 in FIG. 1 includes a multiplexer from the M front end units 120 to the N processing elements 140. In other words, the interconnector connects a processing element 140 of the N processing elements 140 to one of M front end units 120 from which the processing element 140 receives instructions. In order to use such a multiplexer in the interconnector 130, the multiplexer receives mux-selection information that dictates which input signal, from one of the M front end units 120, is connected to which output of the N processing elements 140 that receives the signal. The controller 150 provides such connection information when it detects branch instructions, thereby mapping the front end units 120 to the processing elements 140.

Figure 2:
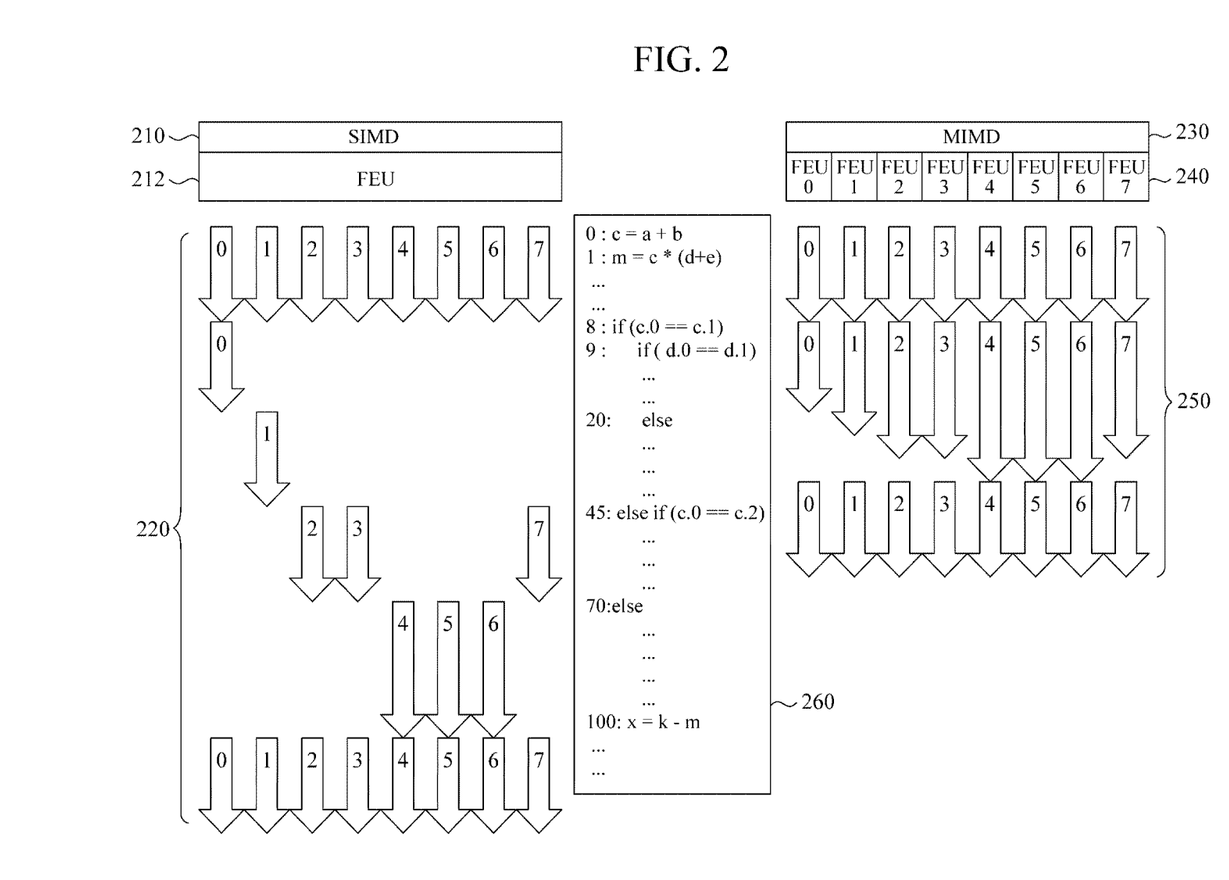
FIG. 2 is a diagram illustrating an example of how to process a conditional branch in a processor.
Figure 3:
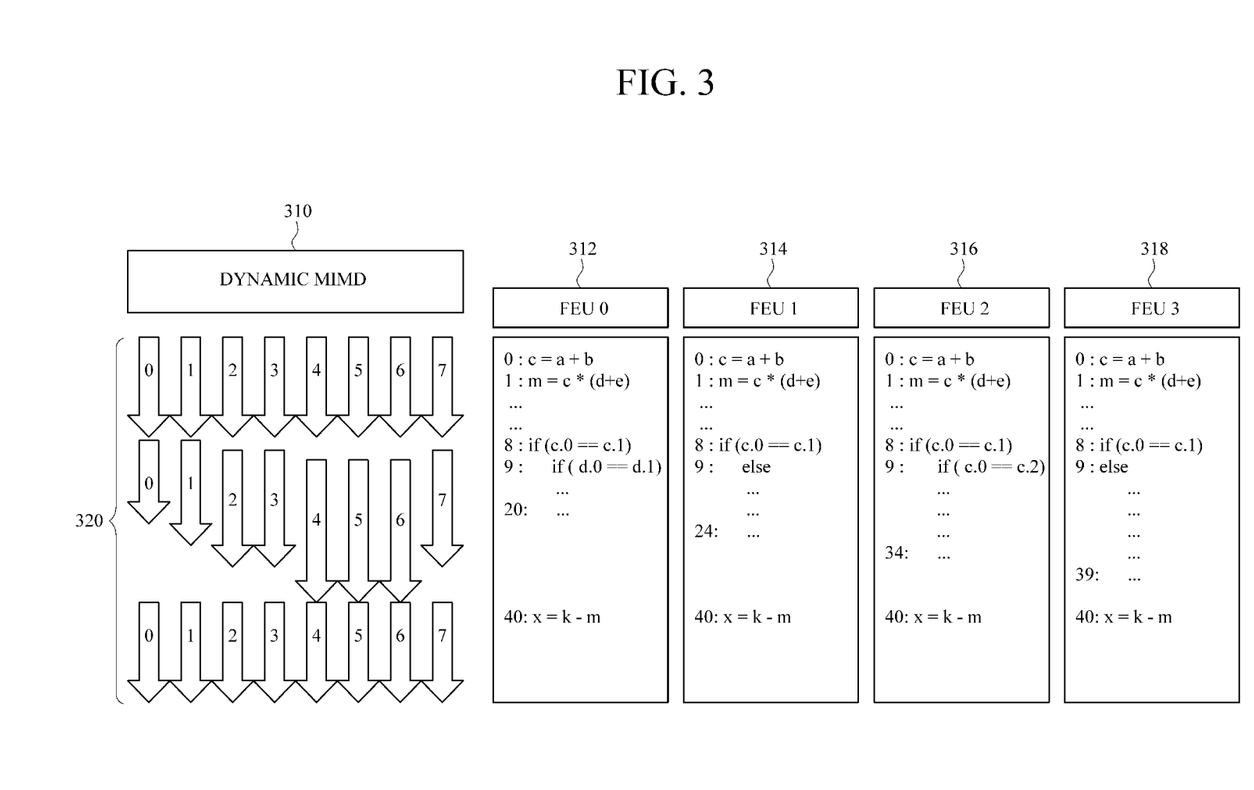
FIG. 3 is a diagram illustrating an example of how to process a conditional branch in a processor according to an example embodiment.

FIG. 2 is a diagram illustrating an example of how to process a conditional branch in a processor. For example, FIG. 2 illustrates how a conditional branch is handled in an SIMD mode, and how the same conditional branch is handled in an MIMD mode. FIG. 3 is a diagram illustrating an example of how to process a conditional branch in a processor according to an embodiment. One way in which FIG. 3 differs from FIG. 2 is that in embodiments, rather than handling conditional branches according to a purely SIMD or MIMD approach, the processor uses a hybrid approach that provides many of the advantages of these modes while minimizing their disadvantages. Thus, FIG. 2 is provided as a basis for comparison to illustrate how SIMD and MIMD modes operate by themselves to help clarify and illustrate how the multimode processing provided by embodiments incorporates features of SIMD and MIMD mode functioning. FIG. 2 shows an SIMD processor 210 and an MIMD processor 230 and how they execute a branched code block 260.

The left-hand side of FIG. 2 illustrates an SIMD mode execution configuration in which eight processing elements process an instruction that is fetched and decoded using a single front end unit. FIG. 2 illustrates an SIMD mode processor 210. The SIMD processor 210 uses one FEU 212. The dataflow through the SIMD processor 210 is illustrated at 220, tracking the execution through the eight processing elements 0 to 7. Before a conditional branch occurs (lines 0 to 7) and after all conditional branches end (lines 100 and following), the eight processing elements 0 to 7 process data in parallel, so that is possible to achieve high processing performance. Because there is no conditional branching in these portions of the code, there is no requirement to execute the threads separately and slow down execution. Hence, all of the processing elements can process those instructions simultaneously. Meanwhile, when the conditional branching occurs (lines 8 to 99), the processing performance decreases because some processing elements have sequentially processed the instructions. For example, the first conditional branch executes lines 8 to 19 of the code. Until this branch resolves, the next processing element is not able to perform the next conditional branch, defined by the code from lines 20 to 44. Another conditional branch follows from lines 45 to 69, and from lines 70 to 99. FIG. 2 shows that the conditional branch defined by the code from lines 45 to 69 can be executed simultaneously by processing elements 2, 3, and 7, and the branch defined by the code from 70 to 99 can by executed simultaneously by processing elements 4, 5, and 6. In FIG. 2, only a subset of the branches are able to execute at a time when there is conditional branching because in SIMD mode, some of the branches need to know the results of the other branches before those branches are able to continue running. As illustrated in FIG. 2, sometimes multiple processing elements process instructions from the same branch and are able to execute those instructions concurrently. For example, FIG. 2 shows that the instructions provided in lines 45 to 69 are executed simultaneously by processing elements 2, 3, and 7, and the instructions provided in lines 70 to 99 are executed simultaneously by processing elements 4, 5, and 6. Thus, even if there is conditional branching in SIMD mode, it is possible that multiple processing elements are able to perform their processing concurrently and provide parallelism. However, as shown with respect to lines 8 to 19 and 20 to 44, it is also possible in SIMD mode that all execution waits for the resolution of a single conditional branch. Thus, SIMD mode is sometimes be able to use multiple processing elements to execute in parallel, but sometimes SIMD mode requires that execution of some processing elements wait for execution of a divergent thread on another processing element to resolve.

The right-hand side of FIG. 2 illustrates an MIMD mode execution configuration in which eight front end units and eight processing elements 0 to 7 are used to process instructions. FIG. 2 illustrates an MIMD mode processor 230. The MIMD processor 230 uses eight front end units 240. The dataflow through the MIMD processor 230 is illustrated at 250. Since there are eight front end units 240 and eight processing elements, each processing element is fed instructions by an individual front end unit that fetches and decodes instructions for that processing element only. Hence, each front end unit/processing element pair is able to process data and execute instructions totally independently from all of the other pairs, and hence there is no requirement for any of the pairs to wait for other threads to resolve execution when executing themselves. For example, in MIMD mode, the eight front end units 240 process instructions of each conditional branch independently and hence it is possible to quickly process the conditional branches. Thus, FIG. 2 shows how all of the front end units 240 execute lines 0 to 7 together at 250. FEU 0 causes processing element 0 to execute the first conditional branch, FEU 1, causes processing element 1 to execute the second conditional branch, FEU 2, 3, and 7 cause processing elements 2, 3, and 7 to execute the third conditional branch, and FEU 4, 5, and 6 cause PE 4, 5, and 6 to execute the fourth conditional branch. Subsequently, all of the front end units continue execution together after the conditional branches are resolved. While MIMD mode does not fully eliminate the requirement for some degree of delay when resolving the conditional branch, because each front end unit is able to direct its processing elements independently, it is unnecessary to wait for each processing element to resolve its part of the branching before resolving the other branches by managing them with other front end unit/processing element pairs. Hence, while the processor is potentially required to wait for the most time-consuming branch to resolve, it is not necessary for the processor to wait for other branches to be resolved before starting other branches.

However, MIMD mode requires a plurality of independent front end units to manage separate fetching and decoding of instructions to the processing elements and thus design complexity and size of the processor are increased. Due to such restrictions, MIMD processors often have fewer processing elements than SIMD processors, in order to create a processor of manageable design complexity and size. The requirement in MIMD processors that each processing element correspond to its own front end unit means that a number of processing elements that would be manageable in an SIMD might not be manageable in an MIMD. Such an MIMD would require not only that many processing elements, but also that number of front end units and hence an MIMD with a given number of processing elements is more complex and larger than an SIMD with a given number of processing elements, for this reason. Hence, there is an inherent tradeoff in the way SIMD mode processors and MIMD mode processors are designed, which leads to certain advantages and disadvantages for each mode in certain situations and use cases.

FIG. 3 is a diagram illustrating an example of how to process instructions in a processor including four front end units FEU 0 to FEU 3 312, 314, 316, and 318 and eight processing elements 0 to 7. FIG. 3 illustrates an example use case according to an example embodiment. As shown in FIG. 3, the embodiment provides for a type of mode referred to as "Dynamic MIMD." For example, a dynamic MIMD processor is provided at 310. Data flow through the dynamic MIMD processor 310 is illustrated at 320. In this mode, front end units 312, 314, 316, and 318 are dynamically activated and deactivated depending on whether it is appropriate to use the front end units 312, 314, 316, and 318 to efficiently handle the execution of branching code. Thus, "Dynamic MIMD" provides an operational mode that is a hybrid between SIMD mode and MIMD mode processing. In situations where SIMD mode processing is sufficient, a "Dynamic MIMD" processor operates using only one front end unit. In other situations, in which it would be helpful to activate additional front end units to help allow parallelism as the code begins to branch, front end units are progressively activated to allow such parallelism during branching. As branches resolve, unnecessary front end units may be deactivated to minimize unnecessary resource usage. Thus, "Dynamic MIMD" provides the ability maximize parallelism while minimizing overhead and resource usage.

For example, an embodiment performs the following operations in the following example approach to "Dynamic MIMD." A front end unit detects a conditional branch instruction that potentially causes divergence between threads. Then, processing elements and the controller determine which processing elements, corresponding to threads, have a jump to branch target program counter (PC) instruction and which processing elements have to go to the next PC instruction. The processing elements which jump are referred to as "taken" processing elements, in that these processing elements invoke a jump, and the other processing elements are referred to as "not-taken" processing elements, in that these processing elements do not invoke a jump. Subsequently, if there is a divergence between the threads executed by the processing elements, the controller allocates a new front end unit, which is not activated currently, to the processing elements which have to jump to branch target PC. Next, the controller updates connection information for the interconnector. Here, the controller sends an enable signal and branch target PC information to the newly assigned front end unit. Afterwards, the front end unit detects the reconversion instruction that indicates that the diverged threads should merge into one Single Instruction Multiple Thread (SIMT) thread. Then, the controller updates connection information for the interconnector. Finally, the controller sends a disable signal and deactivates the front end unit.

With respect to the reconversion instruction, if a front end unit detects a reconversion instruction when decoding the reconversion instruction, the front end unit waits until the diverged threads which are allocated to other front end units arrive at their reconversion instructions. The controller receives information from both diverged front end units and deactivates one of them.

Referring to FIG. 3, only FEU 0 312 is activated initially. While FIG. 3 shows an illustrative example in which FEU 0 312 is activated initially, any one of the front end units may be the initially activated front end unit. FEU 0 312 is used by all of the eight processing elements 0 to 7 to process instructions (lines 0 to 7) until a conditional branch is detected. That is, FEU 0 312 fetches and decodes instructions for all of the processing elements 0 through 7. Because there is no branching, each of the processing elements process the same instruction, received from FEU 0 312, in parallel. Up until this point, the processor effectively operates using an SIMD approach. While there are other front end units present in MIMD processor 310, these front end units are inactive. Hence, there is no overhead for the other front end units and because the front end units are inactive, the single front end unit that is active acts as if it were the only front end unit present in the processor. Because there are no other front end units that are active, there is no requirement to coordinate activity between multiple front end units at this point. There is no requirement for more than one front end unit, as there is no branching so all of the processing can occur in parallel without the requirement for the separate fetching and decoding that would require multiple front end units.

However, branching occurs later in the example code of FIG. 3, starting at line 8. In response to a conditional branch instruction (if (c.0==c.1)) at line 8 being fetched by FEU 0 312 from the instruction cache 110, processing element 0 processes the conditional branch instruction (if (c.0==c.1)). In response to a subsequent conditional branch instruction (if (d.0==d.1)) at line 9 being fetched by the FEU 0 312, the processing element 0 processes the fetched conditional branch instruction (if (d.0==d.1)). In this case, if thread divergence occurs, FEU 1 314 is activated among other valid front end units FEU 1 314, FEU 2 316, and FEU 3 318. However, the activation of FEU 1 is an arbitrary choice and another of the valid front end units, such as FEU 2 316 and FEU 3 318, may be activated in lieu of FEU 1 314. By using the activated FEU 1 314, processing element 1 executes a conditional branch instruction (i.e., ELSE instruction) which is paired with the conditional branch instruction (if (d.0==d.1)) and its following instructions. Thus, it is possible to continue execution using these two front end units (FEU 0 312 and FEU 1 314) without requiring a wait for the thread divergence to resolve. FIG. 3 illustrates the fetched code from the perspective of each of the front end units FEU 0 through FEU 3 312, 314, 316, and 318, in an example embodiment. As shown in FIG. 3, with respect to this initial branching, from the perspective of FEU 0 312, the code is fetched based on the branching scenario in which c.0 is equal to c.1 and d.0 is equal to d.1. From the perspective of FEU 1 314, the code is fetched based on the scenario in which c.0 is equal to c.1, but d.0 is not equal to d.1. FEU 0 312 fetches and decodes these instructions for processing element 0, and FEU 1 314 fetches and decodes these instructions for processing element 1. However, because multiple front end units are available, FEU 1 314 is able to send instructions to processing element 1 process in parallel immediately, and there is no requirement for processing element 0 to finish its processing before processing element 1 finishes processing.

In a similar manner, when thread divergence occurs as a result of processing the conditional branch instruction (if (c.0==c.1)) fetched by the FEU 0 312 at line 8, FEU 2 316 is activated and processing elements 2, 3, and 7 execute a conditional branch instruction (else if (c.0==c.2)), which is paired with the conditional branch instruction (if (c.0==c.1)), and its following instructions (through line 34) by using the activated FEU 2 316. Also, if thread divergence occurs when the FEU 2 316 executes the conditional branch instruction (else if (c.0==c.2)) at line 9, FEU 3 318 is activated and processing elements 4, 5, and 6 process a conditional branch instruction (i.e., the else instruction), which is paired with the conditional branch instruction (else if (c.0==c.2)), and its following instructions (through line 39). Thus, each of the front end units FEU 0 312, FEU 1 314, FEU 2 316, and FEU 3 318 is progressively activated as threads diverge and it becomes advantageous to active each front end unit. Additionally, each front end unit is able to provide fetching and decoding for a family of processing elements. For example, FEU 2 316 is able to fetch and decode the same instructions for processing elements 2, 3, and 7 because all of these processing elements correspond to the same code in the code region managed by FEU 2 316, and hence in an embodiment these processing elements operate in parallel without the need to use separate front end units to fetch and decode instructions for the processing elements.

As shown in FIG. 3, the processor 100 dynamically activates the front end units 120 (FIG. 3 illustrates an example set of four front end units 120, including FEU 0-3 312, 314, 316, and 318) to process instructions, depending on the occurrence of thread divergence resulting from conditional branches in the code, and thereby achieving efficient data parallelism and conditional branch processing. For example, the controller 150 sends signals to the front end units 120, depending on whether it is appropriate that the front end units 120 be active or not. Furthermore, the controller 150 may contain registers 160 that contain operational parameters for the front end units 120. As noted above, some embodiments may be even more efficient by allowing a front end unit 120 to provide instructions in parallel for a set of processing elements 140 that execute the same code, rather than requiring that every processing element 140 have its own individual front end unit. Because the front end units 120 are activated dynamically, they are available when needed but overhead is minimized otherwise, as the front end units 120 are inactive except when needed.

As shown in FIG. 1, the controller 150 may include at least two registers 160. For example, the controller 150 includes a plurality of registers 160 that are provided in the same quantity as the number M of the front end units 120 to store control information associated with the respective front end units FEU_0 to FEU_M−1 120. Thus, each register 160 stores information that defines operational parameters and provides temporary storage that enables the controller 150 to control the operation of one of the front end units 120.

The control information may include information regarding each front end unit 120, such as processing-element allocation information, occupied program counter (PC) information, unoccupied PC information, return PC information and branch FEU information. However, the control information may also store additional information, and the information regarding each front end unit 120 may also be stored in different orders. In general, a PC refers to a register that contain a memory address of an instruction to manage accessing a program for execution. Here, the occupied PC information 162 is obtained using PC information contained in a conditional branch instruction, and may be, for example, a value obtained by adding a current PC value and a relative PC value that indicates a relative location to which the instruction jumps in response to a Boolean value of a conditional branch being true. For example, the current PC value may store the address of the current instruction, and the relative PC value may store a number indicating how many instructions to skip ahead when branching. The unoccupied PC information 163 indicates the next instruction of a current conditional branch instruction, and the return PC information 164 is obtained using relative return PC information that indicates a relative location at which an instruction returns when a conditional branch contained in a reconversion instruction is terminated.

For example, if the branch FEU information is connection information, it is updated when the FEU detects conditional branch instructions or reconversion instructions. The branch FEU information is information that indicates which FEU supplies instructions to a processing element, and it is used to configure the interconnector.

Furthermore, at every cycle each FEU updates its PC to PC+instruction_size if it does not detect any type of branch. For example, the instruction size may be 32 bits or 64 bits, depending on the processing architecture. Alternatively, if an FEU detects a jump or conditional branch instruction, the FEU updates the PC value to a branch-target PC value, such as current PC+relative PC value. Such an approach to updating the PC value causes the program flow to proceed appropriately to take into account branching.

In addition, the branch FEU information 165 is information about each front end unit 120 that helps manage processing each thread resulting from thread divergence that occurs due to a conditional branch instruction. In the case where the front end units 120 are activated to help process conditional branching instructions, relationship information defining the relationship between parent front end units and child front end units may be included in the branch FEU information. Such information about relations allows the processor 100 to coordinate the relationships between front end units 120 as branches develop sub-branches during thread divergence.

Referring back to FIG. 1, each of the registers 160 in the controller 150 associated with the respective front end units 120 may include one or more areas 161 to 165 to store the respective pieces of control information, discussed above. In this case, an area 161 of one of the registers allocated to store the processing-element allocation information of the corresponding front end unit 120 may be divided into as many bit-areas V0 to VN−1 as the total number of processing elements 140. Thus, each of bits V0 to VN−1 in the area 161 may be statically mapped with the respective processing elements 140 to indicate by their set value whether the corresponding processing elements 140 are allocated or not to the front end units 120. For example, the processing elements PE_0 to PE_N−1 may be sequentially mapped with bits of the bit-areas V0 to VN−1, and the controller 150 may set the bits which are mapped with the processing elements 140 allocated to the front end units 120 as "1" and set the remaining bits as "0". Thus, each bit from the bit-areas 161 signifies a Boolean value that indicates whether that front end unit 120 is sending instructions to that processing element.

If one front end unit 120, for example, FEU 0, is previously set to operate the processor 100 initially in SIMD mode, the controller 150 activates the front end unit 120 FEU 0 so that it is able to fetch and decode instructions for the processing elements 140. Each of the processing elements 140 is mapped with a bit of each of the bit-areas V0 to VN−1 of the register 160 to store associated processing element allocation information. The controller 150 sets a bit to "1" when the bit corresponds to the processing element 140 that is to process an instruction of the currently activated front end unit 120 FEU 0. For example, suppose that FEU 0 includes 4 bits, V0 to V3. If V0 and V1 are set to "1" and V2 and V3 are set to "0," this indicates that FEU 0 is providing instructions to PE_0 and PE_1, but not to PE_2 or PE_3.

For example, when the currently activated front end unit 120 FEU 0 detects a conditional branch instruction while decoding an instruction fetched from the instruction cache 110, the front end-unit 120 FEU 0 transmits occupied PC information and unoccupied PC information to the controller 150 based on the PC information contained in the detected conditional branch instruction. In an example, occupied PC information refers to PC information corresponding to taken PC information, in which a branch instruction is executed, and unoccupied refers to PC information corresponding to not-taken PC information, in which a branch instruction is not executed. In response to receiving the occupied PC information and the unoccupied PC information from the activated front end unit 120 FEU 0, the controller 150 may, respectively, store the received pieces of information in an occupied PC information storage area 162 and an unoccupied PC information storage area 163 of the register 160 associated with the front end unit 120 FEU 0. By storing these pieces of PC information, embodiments may ascertain memory addresses that can be used to coordinate program flow for multiple branches of execution simultaneously.

For example, when there is a single currently activated front end unit 120 FEU 0, the interconnector 130 identifies the processing elements 140 that are allocated to the currently activated front end unit 120 FEU 0, with reference to the control information stored in the register 160, and transmits to the identified processing elements 140 the instruction output from the front end unit 120 FEU 0.

The processing elements 140 may process the conditional branch instruction received from the interconnector 130 to determine the processing result obtained from the conditional branch instruction, and transmit the processing result ("True" or "False") to the controller 150.

The controller 150 may determine the occurrence of thread divergence based on the received processing result. For example, if the processing result indicates "true", then the controller 150 determines that the thread divergence does not occur, and the processing elements 140 allocated to the currently activated front end unit 120 FEU 0 move to the occupied PC point to continue to process the instruction. In this situation, in which the processing result is "true," the result of "true" is taken to be the resolution of the conditional branch instruction that is not taken to be divergence. As discussed above, the occupied PC point is the memory address that corresponds to the next instruction that occurs when a conditional branch instruction does not diverge.

In response to the processing result being "false," the controller 150 determines that thread divergence occurs. As discussed above, thread divergence occurs because a "false" outcome is considered to be the divergent result. Because there is thread divergence, there is now a need to activate a new front end unit 120 to handle the divergent execution in parallel, to avoid any additional delay. The controller 150 activates a new front end unit 120 FEU 1, updates the bit-areas of the register associated with the currently activated front end unit 120 FEU 0 and the newly activated front end unit 120 FEU 1 and allocates the processing elements 140 to front end units 120 FEU 0 and FEU 1. When the controller 150 performs these operations, it changes the registers 160 discussed above in a way that affects the settings of the front end units 120 so that they fetch and decode instructions and route them to the processing elements 140 appropriately through the interconnector 130.

In addition, the controller 150 may store unoccupied PC information received from the current front end unit 120 FEU 0 in the occupied PC information storage area 162 of the register 160 associated with the additionally activated front end unit 120 FEU 1, and may control the processing elements 140 to move to the unoccupied PC point in memory and enable front end unit 120 FEU 1 to process the instruction based upon the unoccupied PC point.

Further, the controller 150 may set front end unit 120 FEU 1 as a child FEU in the branch FEU information 165 of the currently activated front end unit 120 FEU 0, and store the branch FEU information in branch FEU information storage area 165 of the register 160 corresponding to front end unit 120 FEU 0. In addition, the controller 150 may set front end unit 120 FEU 0 as a parent FEU in branch FEU information of the additionally activated front end unit 120 FEU 1, and store the branch FEU information in the branch FEU information storage area 165 of the register 160. Thus, the parent-child relationship between FEU 0 and FEU 1 is stored such that the branch FEU information of FEU 0 indicates that FEU 1 is a child of FEU 0, and the branch FEU information of FEU 1 indicates that FEU 0 is a parent of FEU 1.

Either the currently activated front end unit 120 FEU 0 or the additionally activated front end unit 120 FEU 1, which detects a reconversion instruction, may transmit to the controller 150 return-PC information that is based on PC information included in the detected reconversion instruction. The return PC information may include, for example, a memory address from which to resume execution after which the threads are no longer divergent. Such a reconversion instruction refers to such a portion of the program, after which the threads are no longer divergent and hence no longer need to be handled by separate execution pathways. For example, the controller 150 stores the received return PC information in a return PC information storage area of the register associated with the front end unit 120 that has detected the reconversion instruction. For example, return PC information is stored in region 164 of the registers. In addition, the controller 150 may use the branch FEU information of the front end unit 120 that has detected the reconversion instruction to select a front end unit 120 that is paired with the front end unit 120 and then remain in standby until the paired front end unit 120 completes its processing of the conditional branch. By using this information, it is possible to coordinate processing so that both sides of the conditional branch are complete before continuing execution. While using multiple front end units 120 allows for different sides of the conditional branch to be executed simultaneously without the need to wait for one another, some embodiments require that both sides of the conditional branch resolve before continuing with the overall execution.

In the case where a front end unit 120 detects a reconversion instruction and thereby the conditional branch terminates, its additionally activated child front end unit 120 FEU 1 is deactivated by the controller 150. Because the conditional branch is over, there is no additional need for processing by the child front end unit 120 and processing is managed using only one front end unit 120 again. Further, the controller 150 may set control information such that the logical OR operation is performed on the bit-field of the register associated with FEU 1 and the bit-area of the register associated with FEU 0 so as to reallocate to FEU 0 the processing elements 140 which have been allocated to FEU 1. By using a logical OR operation, any processing elements 140 that were previously assigned to at least one of FEU 0 or FEU 1 are assigned to FEU 0 after the registers are ORed together. By so doing, the divergent threads that were allocated to FEU 1 can be reintegrated into FEU 0 so as to minimize the number of operational front end units 120 on a dynamic basis.

Figure 4:
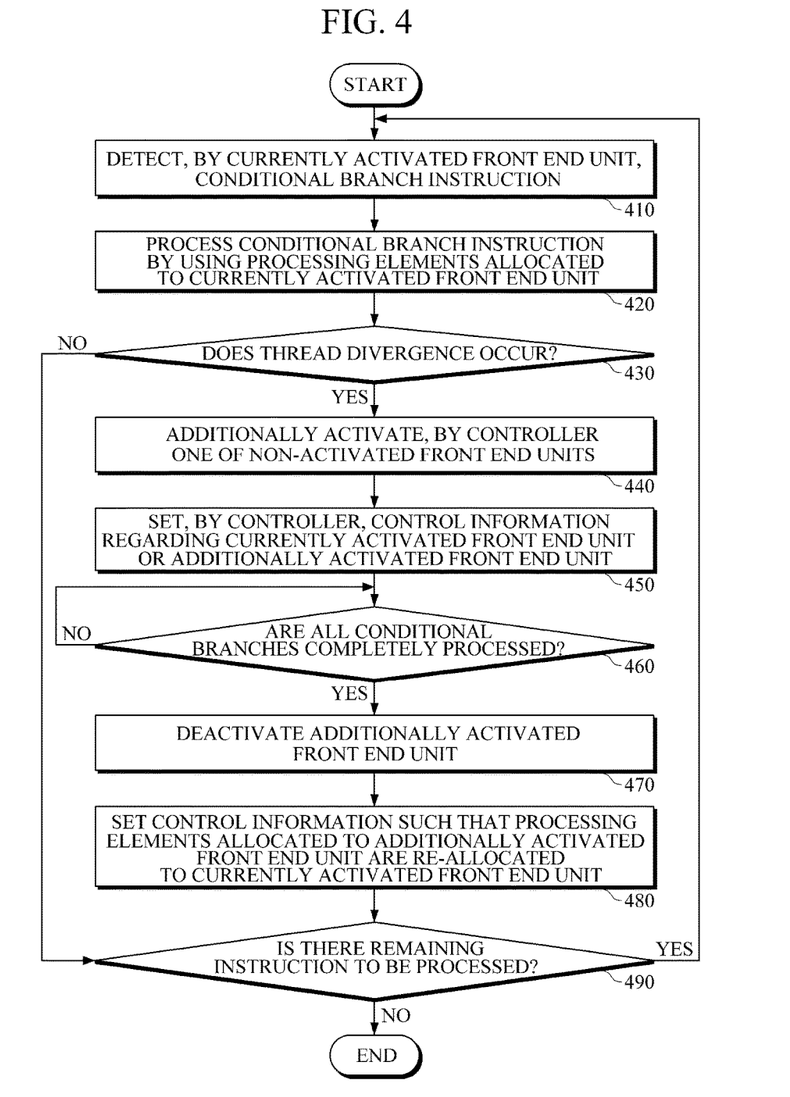
FIG. 4 is a flowchart illustrating a method of supporting multi-mode in a processor according to an example embodiment.

FIG. 4 is a flowchart illustrating a method of supporting multi-mode in a processor according to an example embodiment. That is, a method of dynamically supporting multi-mode in the processor 1 of FIG. 1 is described with reference to FIG. 4.

First, in operation 410, when a currently activated front end unit 120 of the processor 100 detects a conditional branch instruction in the course of fetching an instruction from the instruction cache 110 and decoding the instruction, occupied PC information and unoccupied PC information are transmitted to the controller 150, based on PC information contained in the conditional branch instruction. As discussed above, occupied PC information pertains to the case in which threads do not diverge, and unoccupied PC information pertains to the case where the threads diverge. Here, the "currently activated front end unit" initially refers to one predefined front end unit 120, and if other front end units 120 are additionally activated in the subsequent operations, the "currently activated front end unit" refers to any activated front end units 120.

Then, the processing elements 140 allocated to the currently activated front end unit 120 receive the conditional branch instruction from the interconnector 130 to process the received conditional branch instruction, and transmit a processing result ("True" or "False") to the controller 150 in operation 420. The interconnector 130 may determine the processing elements 140 to which to transmit the instruction output from the currently activated front end unit 120, based on control information stored in the register 160 associated with the currently activated front end unit 120. For example, as discussed, the processing elements 140 to which to transmit the instruction output may be chosen based on the area 161 of bits that designate which processing elements correspond to the activated front end unit 120.

Thereafter, in operation 430, the controller 150 receives the occupied PC information and the unoccupied PC information from the currently activated front end unit 120. The controller stores the received occupied PC information and unoccupied PC information, respectively, in the occupied PC information storage area 162 and the unoccupied PC information storage area 163 of the register 160 associated with the currently activated front end unit 120, and determines whether thread divergence occurs, based on the processing result corresponding to the conditional branch instruction received from the processing element 140 as a result of operation 420.

In response to determining that the thread divergence does not occur, for example, in response to the processing result from operation 420 being "True", the processing elements 140 allocated to the currently activated front end unit 120 move to the occupied PC position, and thus the next instruction is enabled to be continuously processed using the currently activated front end unit 120 in operation 490. In this situation, there is no need to activate another front end unit 120, so execution simply proceeds using the existing allocation of front end units 120.

In response to a determination that the thread divergence occurs, for example, in response to the processing result from operation 420 being "False", the controller 150 additionally activates another front end unit 120 in operation 440. If all front end units 120 of the processor 100 are activated, the controller 150 may control the front end unit 120 that is currently activated and has detected the conditional branch instruction to sequentially process the instruction because there is no other valid front end unit 120. As discussed above, various embodiments generally use a number M of front end units 120 that is less than or equal to the number N of processing elements 140. If all of the front end units 120 are in use, it may be necessary to process a conditional branch instruction sequentially.

Then, control information about the currently activated front end unit 120 and the additionally activated front end unit 120 is updated or set in operation 450. For example, bit fields of the registers 160 associated with the respective front end units 120 are updated to allocate the processing elements 140 to the respective front end units 120. As discussed above, each of the bits in the bit fields is indicative of whether that particular front end unit 120 sends instructions to a given processing element 140. Moreover, the controller 150 may store the unoccupied PC information received from the currently activated front end unit 120 as occupied PC information of the additionally activated front end unit 120, and control the processing elements 140 to move to the unoccupied PC position and process the instruction. This relationship between the unoccupied PC information of the currently activated end unit 120 and the occupied PC information of the additionally activated front end unit 120 is maintained because the unoccupied execution path that involves further branching for the currently activated end unit 120 is the occupied execution path that does not involve further branching for the additionally activated front end unit 120.

Furthermore, the controller 150 sets branch FEU information of the currently activated front end unit 120 to have the additionally activated front end unit 120 be designated as a child FEU, and stores the set information in the branch FEU information storage area 165 of the register 160 of the currently activated front end unit 120. Further, the controller 150 sets branch FEU information of the additionally activated front end unit 120 to have the currently activated front end unit 120 be designated as a parent FEU, and stores the set information in the branch FEU information storage area 165 of the register 160. Thus, the branch FEU information manages the relationship between parent and child front end units, which helps preserve branch hierarchy when transferring instructions between front end units 120 and processing elements 140, such as through interconnector 130.

Thereafter, in operation 460, in response to receiving return PC information from either the currently activated front end unit 120 or additionally activated front end unit 120, which detects a reconversion instruction, the controller 150 uses the branch FEU information of the front end unit 120 that transmits the return PC information to select a front end unit 120 that is paired with the front end unit 120 that has detected the reconversion instruction, and remains in standby until the determined front end unit 120 completes processing the conditional branch. When the return PC information is received, the return PC information acts as a signal that the conditional branch has resolved. This constitutes a reconversion instruction, indicating that from the perspective of the front end unit 120 that sends this instruction, the conditional branch is complete. However, as noted, the branch FEU information provides information about which other front end units 120 are required to complete execution before execution can continue. In addition, the controller 150 may store the received return PC information in the return PC information storage area 164 of the register 160 associated with the front end unit 120 that has detected the reconversion instruction. If the received return PC information is stored, it is potentially used later to ensure that program flow continues in an appropriate sequence.

Then, in operation 470, in response to the paired front end unit 120 detecting a reconversion instruction and thereby all conditional branches being terminated, the controller 150 deactivates the additionally activated front end unit 120. At this point, there is no need to continue using the additionally activated front end unit 120, so only those front end units 120 that are actively being used continue execution.

In operation 480, control information is set such that logical OR operation is performed on the bit-area of the register associated with the deactivated front end unit 120 and the bit-area of the register associated with the currently front end unit 120 and thereby the processing elements 140 allocated to the deactivated front end unit 120 are reallocated to the currently activated front end unit 120. As discussed above, any processing elements 140 that were allocated to the deactivated front end unit 120 are reallocated to the currently activated front end unit 120 without removing any previously allocated processing elements 140.

In operation 490, the controller 150 controls the currently activated front end unit 120 to continue to process the next instruction. For example, the currently activated front end unit 120 may continue to fetch an instruction which is to be processed next, and operations following operation 410 may be repeatedly performed.

The examples of a processor capable supporting multi-mode and a related multimode supporting method may provide advantages when performing parallel processing of data. According to embodiments, it is possible to allow processing elements to dynamically share front end units, and to allow a processor to switch mode between SIMD and MIMD execution, thereby reducing the front end unit cost and enhancing processing speed.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor comprising:
a plurality of front end units;
a plurality of processing elements, wherein a total number of the plurality of processing elements is greater than or equal to a total number of the plurality of front end units; and
a controller comprising a plurality of registers and configured to determine whether thread divergence occurs due to a conditional branch instruction detected by an active first front end unit among the plurality of front end units,
wherein the controller is further configured to:
when it is determined that the thread divergence occurs:
activate one or more other front end units, among the plurality of front end units,
wherein the active first front end unit and the activated one or more other front end units constitute a plurality of active front end units,
set control information for the plurality of processing elements to dynamically allocate multiple arbitrary processing elements, among the plurality of processing elements, to the plurality of active front end units, and
control each of the multiple arbitrary processing elements, dynamically allocated to a corresponding active front end unit among the plurality of active front end units, to process an instruction decoded by the corresponding active front end unit, and,
when it is determined that the thread divergence does not occur,
set the control information to control the plurality of processing elements to process an instruction using the active first front end unit,
wherein each of the plurality of registers is associated with a corresponding front end unit among the plurality of front end units, and is configured to store processing element allocation information for the corresponding front end unit,
wherein each of the plurality of registers comprises a plurality of bit-areas,
wherein a total number of bit-areas in each of the plurality of registers is equal to the total number of the plurality of processing elements, and
wherein the plurality of bit-areas is configured to store the processing element allocation information of the corresponding front end unit.

2. The processor of claim 1, further comprising:
an interconnector configured to determine which of the dynamically allocated multiple arbitrary processing elements to use to process a first instruction decoded by one of the plurality of active front end units, and to transmit the decoded first instruction to the determined processing element.

3. The processor of claim 1, wherein the controller determines whether the thread divergence occurs by receiving, from a first processing element among the plurality of processing elements, a result of processing the conditional branch instruction detected by the active first front end unit, and the first processing element is allocated to the active first front end unit.

4. The processor of claim 3, wherein when all branches resulting from the conditional branch instruction are terminated, the controller reallocates the multiple arbitrary processing elements to at least one but not all of the plurality of active front end units.

5. A method for supporting multi-mode processing, comprising:
determining, at a controller of a processor, that thread divergence occurs in response to a result of processing a conditional branch instruction detected by an active first front end unit;
activating an additional front end unit;
setting, at the controller, control information such that arbitrary processing elements, among a plurality of processing elements, are dynamically allocated between the active first front end unit and the activated additional front end unit, wherein a first processing element is allocated to the active first front end unit and a second processing element is allocated to the activated additional front end unit; and
reallocating, upon termination of the thread divergence, the second processing element to the active first front end unit, and deactivating the activated additional front end unit,
wherein the first processing element processes a first instruction decoded by the active first front end unit,
the second processing element processes a second instruction decoded by the activated additional front end unit,
the controller comprises a plurality of registers,
each of the plurality of registers is associated with a corresponding front end unit among all front end units, and is configured to store processing element allocation information for the corresponding front end unit,
each of the plurality of registers comprises a plurality of bit-areas,
a total number of bit-areas in each of the plurality of registers is equal to a total number of the plurality of processing elements, and
the plurality of bit-areas is configured to store the processing element allocation information of the corresponding front end unit.

6. The method of claim 5, wherein the total number of the plurality of processing elements is greater than or equal to a total number of all front end units of the processor.

7. The method of claim 5, further comprising:
receiving, from the arbitrary processing elements, a result of processing instruct instructions resulting from the conditional branch instruction, and
determining whether the thread divergence continues using the received result from the arbitrary processing elements.

8. The method of claim 5, wherein setting the control information comprises setting a bit value of at least one of the plurality of bit-areas of a second register associated with the activated additional front end unit, and
wherein the bit value corresponds to allocation of one of the plurality of processing elements to the activated additional front end unit.

9. The method of claim 5, further comprising:
determining, at the controller, whether all branches resulting from the conditional branch instruction are terminated,
wherein reallocating the second processing element is performed by setting the control information, when it is determined that all branches resulting from the conditional branch instruction are terminated.

10. A multimode processor, comprising:
a controller comprising a plurality of registers, and configured to activate front end units of the multimode processor and set control information to dynamically allocate first arbitrary processing elements, among a plurality of processing elements, to an active first front end unit,
wherein, in response to a determination by the controller that a thread divergence occurs, the controller is further configured to:
activate a second front end unit; and
set control information to allocate second arbitrary processing elements, which are not allocated to the active first front end unit, to the activated second front end unit,
wherein the second arbitrary processing elements are configured to process an instruction decoded by the activated second front end unit,
wherein each of the plurality of registers is associated with a corresponding front end unit among all front end units, and is configured to store processing element allocation information for the corresponding front end unit,
wherein each of the plurality of registers comprises a plurality of bit-areas,
wherein a total number of bit-areas in each of the plurality of registers is equal to total number of the plurality of processing elements, and
wherein the plurality of bit-areas is configured to store the processing element allocation information of the corresponding front end unit.

11. The multimode processor of claim 10, wherein the total number of the plurality of processing elements is greater than or equal to a total number of the front end units of the multimode processor.

12. The multimode processor of claim 10, wherein the controller is further configured to:
receive, from the first and second arbitrary processing elements, results of processing instructions resulting from the conditional branch instruction, and
determine whether the thread divergence has terminated using the received results.

13. A multimode processor, comprising:
a plurality of front end units;
a plurality of processing elements; and
a controller comprising a plurality of registers,
wherein the controller is configured to:
determine that thread divergence occurs in response to a result of processing a conditional branch instruction detected by an active first front end unit among the plurality of front end units;
perform, when it is determined by the controller that the thread divergence occurs,
an activation of an additional front end unit, and
a setting of control information to dynamically allocate arbitrary processing elements, among the plurality of processing elements, between the active first front end unit and the activated additional front end unit, wherein a first processing element is allocated to the active first front end unit and a second processing element is allocated to the activated additional front end unit; and
reallocate, upon termination of the thread divergence, the second processing element to the active first front end unit, and deactivate the activated additional front end unit,
wherein the first processing element processes a first instruction decoded by the active first front end unit,
the second processing element processes a second instruction decoded by the activated additional front end unit,
each of the plurality of registers is associated with a corresponding front end unit among the plurality of front end units, and is configured to store processing element allocation information for the corresponding front end unit,
each of the plurality of registers comprises a plurality of bit-areas,
a total number of bit-areas in each of the plurality of registers is equal to a total number of the plurality of processing elements, and
the plurality of bit-areas is configured to store the processing element allocation information of the corresponding front end unit.

14. The multimode processor of claim 13, wherein setting the control information comprises setting a bit value of at least one of the plurality of bit-areas of a second register associated with the activated additional front end unit, and
wherein the bit value corresponds to allocation of one of the plurality of processing elements to the activated additional front end unit.

15. The multimode processor of claim 13, wherein reallocation of the second processing element is performed by performing a logical OR operation on one of the plurality of bit-areas of a first register associated with the active first front end unit and one of the plurality of bit-areas of a second register associated with the activated additional front end unit.

* * * * *